(12) United States Patent
Chang et al.

(10) Patent No.: US 7,683,900 B2
(45) Date of Patent: *Mar. 23, 2010

(54) SYSTEM AND METHOD FOR PROCESSING A POINT CLOUD IN A SIMULATED THREE-DIMENSIONAL SPACE

(75) Inventors: Chih-Kuang Chang, Tu-Cheng (TW); Xiao-Chao Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1133 days.

This patent is subject to a terminal disclaimer.

(21) Appl. No.: 11/025,320

(22) Filed: Dec. 29, 2004

(65) Prior Publication Data
US 2005/0264556 A1 Dec. 1, 2005

(30) Foreign Application Priority Data
May 26, 2004 (CN) .......................... 2004 1 0027401

(51) Int. Cl.
*G06T 15/00* (2006.01)
*G06F 19/00* (2006.01)
*G06K 9/00* (2006.01)
*G01C 9/00* (2006.01)

(52) U.S. Cl. .................. 345/419; 700/98; 382/154; 702/152

(58) Field of Classification Search ................ 345/440, 345/419; 700/98; 382/154; 702/152
See application file for complete search history.

(56) References Cited

U.S. PATENT DOCUMENTS

| | | | |
|---|---|---|---|
| 5,621,648 A | 4/1997 | Crump | ........................ 700/112 |
| 6,268,871 B1 * | 7/2001 | Rice et al. | .................... 345/442 |
| 6,420,698 B1 * | 7/2002 | Dimsdale | .................... 250/234 |
| 6,772,026 B2 * | 8/2004 | Bradbury et al. | .............. 700/98 |
| 7,027,642 B2 * | 4/2006 | Rubbert et al. | .............. 382/154 |
| 7,047,151 B2 * | 5/2006 | Chang | ......................... 702/152 |
| 7,068,825 B2 * | 6/2006 | Rubbert et al. | .............. 382/128 |

* cited by examiner

*Primary Examiner*—Ryan R Yang
(74) *Attorney, Agent, or Firm*—Frank R. Niranjan

(57) ABSTRACT

A system for processing a point cloud in a simulated three-dimensional space includes an application server (1), client computers (3), and a database (5). The application server includes: a data acquiring module (10) for acquiring from the database point cloud data on an object measured by a measurement apparatus; a point cloud editing module (12) for editing the point cloud data to make the point cloud smooth and regular, and displaying different portions of the point cloud by using different colors; and a view changing device (11). The view changing device includes a position changing module (110) and a view changing module (111). The position changing module is used for changing a position of the point cloud in the three-dimensional space. The view changing module is used for changing a view to the point cloud in the three-dimensional space. A related method is also disclosed.

7 Claims, 3 Drawing Sheets

SYSTEM AND METHOD FOR PROCESSING A POINT CLOUD IN A SIMULATED THREE-DIMENSIONAL SPACE

BACKGROUND OF THE INVENTION

1. Field of the Invention

The present invention generally relates to Computer Aided verification (CAV) systems and methods, and more particularly to systems and methods for processing a point cloud in a simulated three-dimensional space.

2. Related Art of the Invention

In recent years, reverse engineering has been applied in a wide range of industrial design and manufacturing fields. Reverse engineering is mainly used for obtaining geometrical data on an object by analyzing and processing point cloud data on the object. Then a user can reproduce the object according to the geometrical data.

U.S. Pat. No. 5,621,648 discloses an apparatus and method for creating three-dimensional modeling data on an object. The apparatus comprises a material removal means, a data requisition means, and an object shuttle. The object shuttle lets the user know where and how the manufactured object is different from the design model.

Even though CAV can indicate difference ranges between the manufactured object and the design object, the user sometimes needs to observe the point cloud from various angles. This is because the user may want to improve the quality of the manufactured object by changing production criteria and procedures. Current technology does not enable the user to observe the point cloud from various angles for precise comparison.

SUMMARY OF THE INVENTION

Accordingly, a general object of the present invention is to provide a system for processing a point cloud in a simulated three-dimensional space.

Another object of the present invention is to provide a method for processing a point cloud in a simulated three-dimensional space.

To accomplish the first of the above objectives, a preferred embodiment of a system of the present invention comprises an application server, a plurality of client computers, and a database. The application server includes: a data acquiring module for acquiring from the database point cloud data on an object measured by a measurement apparatus; a point cloud editing module for editing the point cloud data to make the point cloud smooth and regular, and for displaying different portions of the point cloud by using different colors; and a view changing device. The view changing device includes a position changing module and a view changing module. The position changing module is used for changing a position of the point cloud in the three-dimensional space. Such change can be any one or more of the following: rotating the point cloud about an X-axis, rotating the point cloud about a Y-axis, rotating the point cloud about a Z-axis, moving the point cloud parallel to the X-axis, moving the point cloud parallel to the Y-axis, and moving the point cloud parallel to the Z-axis. The view changing module is used for changing a view to the point cloud in the three-dimensional space. The view to the point cloud can be any one of a top view, a bottom view, a right side view, a left side view, a front view, a rear view, and so on.

To accomplish the second of the above objectives, a preferred method of the present invention comprises the steps of: acquiring point cloud data from a database; changing a position of the point cloud in a three-dimensional space; editing the point cloud; changing a view to the point cloud in the three-dimensional space; and editing the point cloud again.

Other objects, advantages and novel features of the present invention will be drawn from the following detailed description thereof with the attached drawings, in which:

DETAILED DESCRIPTION OF THE INVENTION

Figure 1:
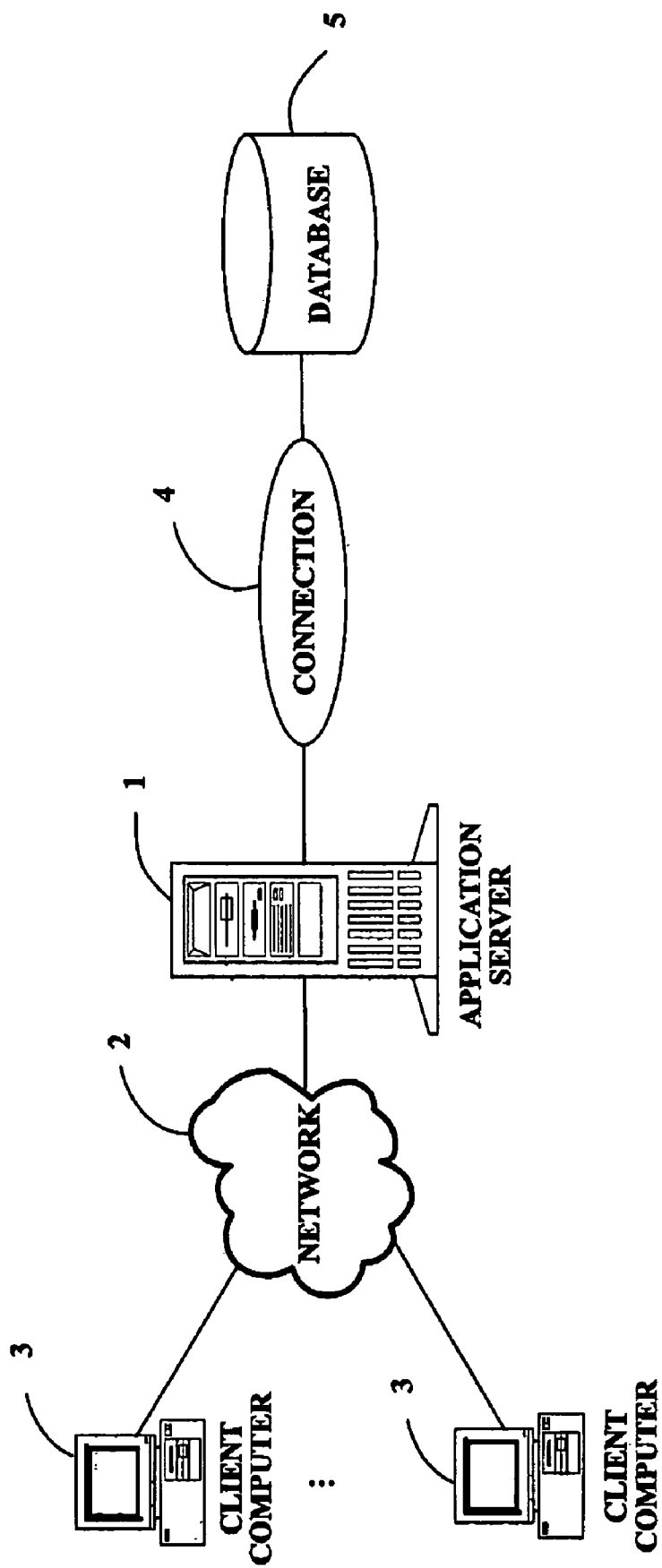
FIG. 1 is a schematic diagram of hardware configuration of a system for processing a point cloud in a simulated three-dimensional space in accordance with the preferred embodiment of the present invention.

FIG. 1 is a schematic diagram of hardware configuration of a system for processing point cloud data in a simulated three-dimensional environment/space (hereinafter, "the system") in accordance with the preferred embodiment of the present invention. The system comprises an application server 1, a plurality of client computers 3, and a database 5. The application server 1 communicates with the client computers 3 via a network 2. The network 2 may be an intranet, the Internet, or any other suitable type of communications link. The application server 1 is connected with the database 5 via a connection 4. The connection 4 is a database connectivity, such as an ODBC (Open Database Connectivity) or a JDBC (Java Database Connectivity). The database 5 is provided for storing point cloud data measured from a physical object by a three-dimensional measurement device. The three-dimensional measurement device may contain various data acquisition devices including laser scanners, coordinate measuring machines and x-ray scanners, for acquiring the point cloud data on the object. The point cloud data can be created by scanning the surface of the object (surface scan) or by scanning the entire region of the object (solid scan), and comprises a plurality of discrete points. The database 5 is also used for managing maintenance of the point cloud data. Such maintenance includes reading, writing, deleting, modifying, and backing up the point cloud data. The application server 1 has a plurality of software function modules installed therein, for processing the point cloud. The client computers 3 are located at various internal departments of an organization operating the system. Users in the organization can access the application server 1 via any of the client computers 3, and obtain results of processing of the point cloud.

Figure 2:
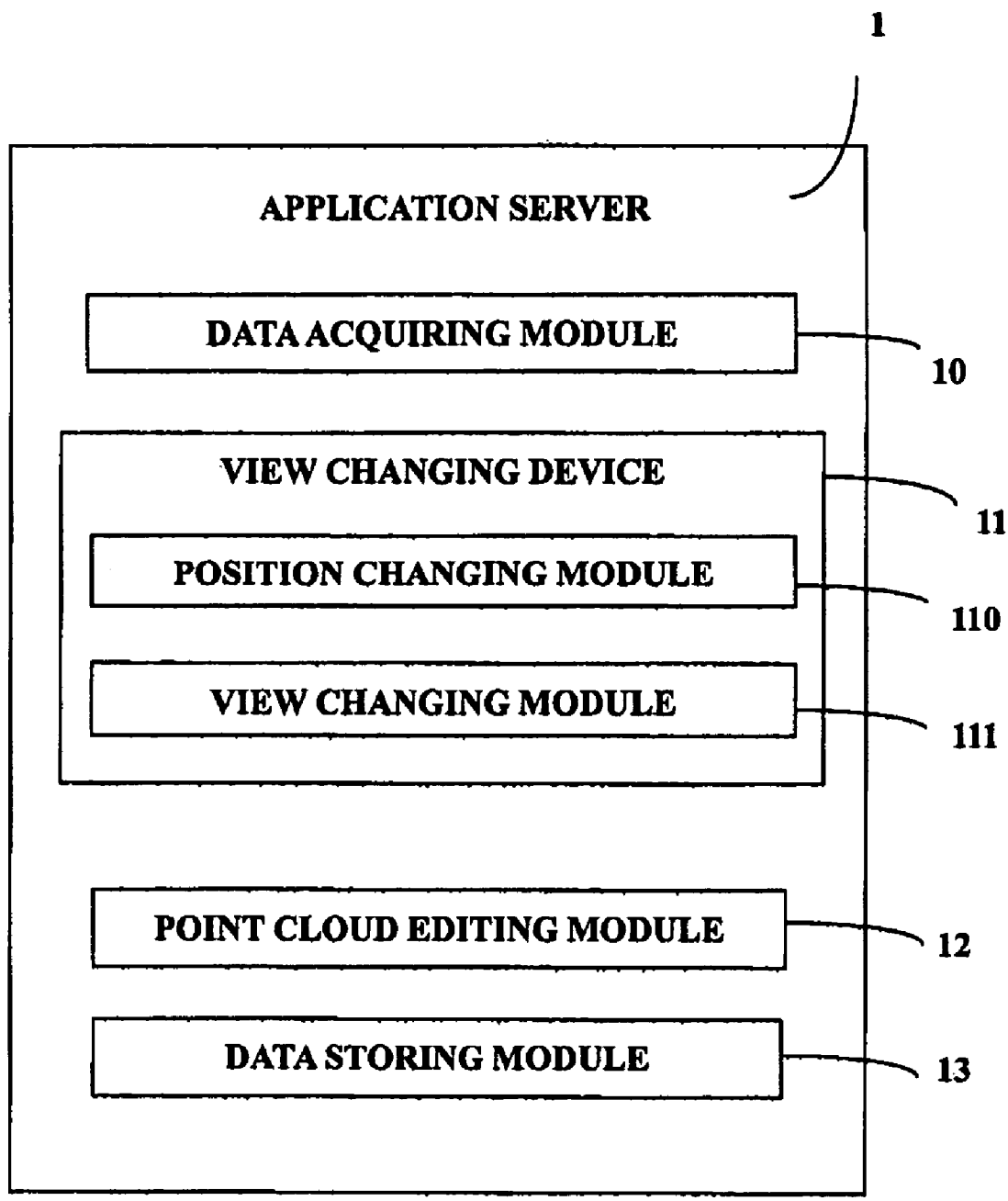
FIG. 2 is a schematic diagram of main software function modules of an application server of the system of FIG. 1.

FIG. 2 is a schematic diagram of main software function modules of the application server 1. The application server 1 has a plurality of computer programs installed therein, for processing a point cloud in a simulated three-dimensional space. The application server 1 comprises a data acquiring module 10, a view changing device 11, a point cloud editing module 12, and a data storing module 13. The data acquiring module 10 is used for acquiring from the database 5 point cloud data on an object measured by a measurement device. The view changing device 11 includes a position changing module 110 and a view changing module 111. The position changing module 110 is used for changing a position of the point cloud in the three-dimensional space. Specifically, such change can be any one or more of the following: rotating the point cloud about an X-axis, rotating the point cloud about a Y-axis, rotating the point cloud about a Z-axis, moving the point cloud parallel to the X-axis, moving the point cloud parallel to the Y-axis, and moving the point cloud parallel to the Z-axis. The view changing module 111 is used for changing a view to the point cloud in the three-dimensional space. The view to the point cloud can be any one of a top view, a bottom view, a right side view, a left side view, a front view, a rear view, and so on. The point cloud editing module 12 is used for editing the point cloud data to make the point cloud smooth and regular, and for displaying different portions of a point cloud by using different colors. The data storing module 13 is used for storing results of processing of the point cloud.

Figure 3:
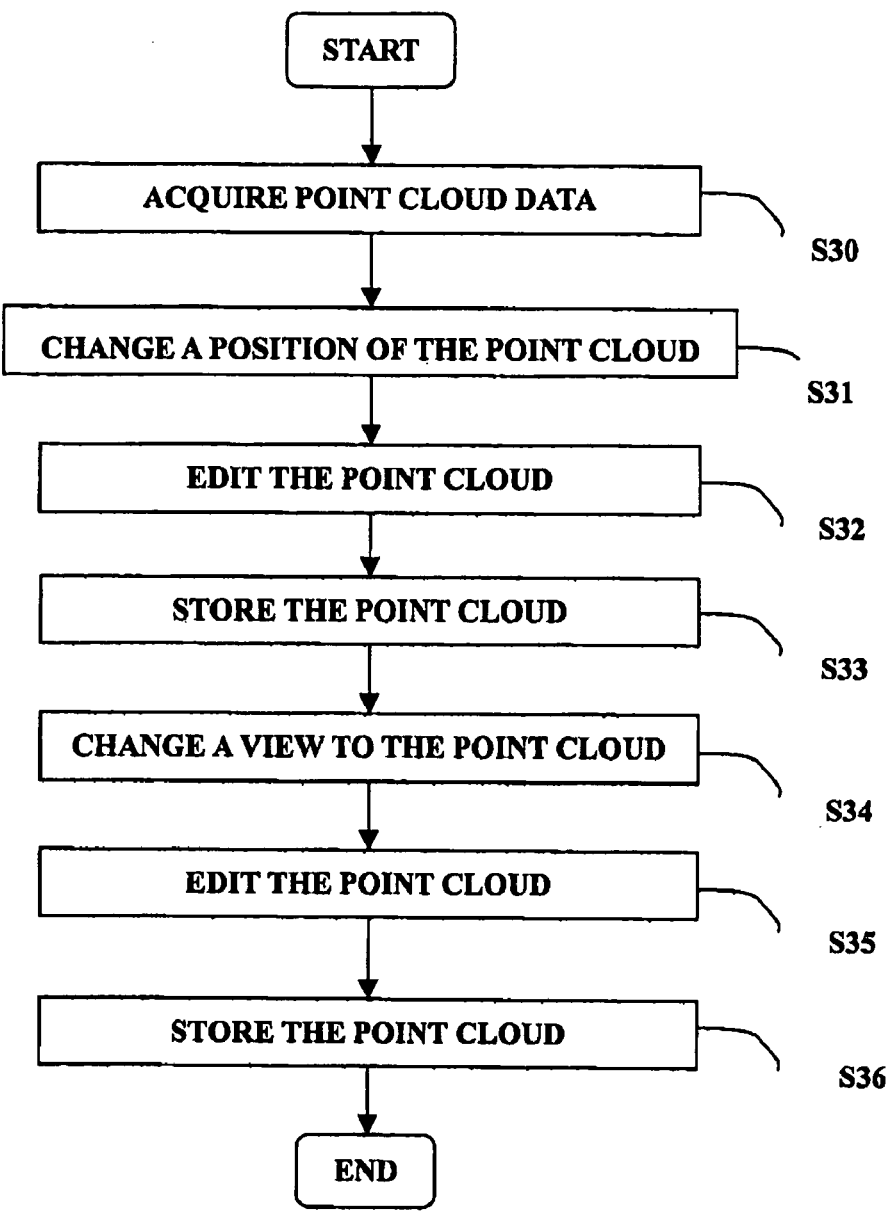
FIG. 3 is a flowchart of the preferred method for processing a point cloud in a simulated three-dimensional space in accordance with the present invention.

FIG. 3 is a flowchart of the preferred method for processing a point cloud in a simulated three-dimensional space according to the present invention. In step S30, the data acquiring module 10 acquires point cloud data measured from an object by a measurement device, the data residing in the database 5. Users in the organization can access the database 5 via the client computers 3, and thus obtain the point cloud data. In step S31, the position changing module 110 changes a position of the point cloud in the three-dimensional space according to demands of the users, in order to obtain an optimum position. The optimum position of the point cloud can be obtained by rotating the point cloud about an X-axis, a Y-axis, and/or a Z-axis, and/or by moving the point cloud parallel to the X-axis, the Y-axis, and/or the Z-axis. In step S32, the point cloud editing module 12 edits the point cloud data to make the point cloud smooth and regular, and displays different portions of the point cloud by using different colors. In step S33, the data storing module 13 stores results of processing of the point cloud. In step S34, the view changing module 111 changes a view to the point cloud in the three-dimensional space. The view to the point cloud can be any one of a top view, a bottom view, a right side view, a left side view, a front view, a rear view, and so on. In step S35, the point cloud editing module 12 edits the point cloud data to make the point cloud smooth and regular, and displays different portions of the point cloud by using different colors. In step S36, the data storing module 13 stores results of processing of the point cloud.

Although the present invention has been specifically described on the basis of a preferred embodiment and a preferred method, the invention is not to be construed as being limited thereto. Various changes or modifications may be made to said embodiment and method without departing from the scope and spirit of the invention.

What is claimed is:

1. A system for processing a point cloud in a simulated three-dimensional space, the system comprising an application server, a plurality of client computers, and a database, wherein the application server comprises:
    a data acquiring module for acquiring point cloud data on an object measured by a measurement apparatus;
    a view changing device comprising:
    a position changing module for changing a position of the point cloud in the three-dimensional space, the position being changed by rotating the point cloud about an X-axis, a Y-axis, and/or Z-axis, and/or moving the point cloud parallel to the X-axis, the Y-axis, and/or the Z-axis; and
    a view changing module for changing a view to the point cloud in the three-dimensional space, the view being changed to any one of a top view, a bottom view, a right side view, a left side view, a front view, and a rear view; and
    a point cloud editing module for editing the point cloud data to make the point cloud smooth and regular, and for displaying different portions of the point cloud by using different colors.

2. The system according to claim 1, wherein the application server further comprises a data storing module for storing results of processing of the point cloud.

3. The system according to claim 1, wherein the measurement apparatus is any one of data acquisition devices including laser scanners, coordinate measuring machines and x-ray scanners.

4. A method for processing a point cloud in a simulated three-dimensional space, the method being performed by execution of computer readable program code by at least one processor of at least one computer system, the method comprising the steps of:
    acquiring point cloud data from a database using the at least one processor;
    changing a position of the point cloud in the three-dimensional space by rotating the point cloud about an X-axis, a Y-axis, and/or Z-axis, and/or moving the point cloud parallel to the X-axis, the Y-axis, and/or the Z-axis using the at least one processor;
    editing the point cloud using the at least one processor;
    changing a view to the point cloud in the three-dimensional space, the view being changed to any one of a top view, a bottom view, a right side view, a left side view, a front view, and a rear view using the at least one processor;
    editing the point cloud again using the at least one processor; and
    displaying different portions of a point cloud by using different colors using the at least one processor.

5. The method according to claim 4, further comprising the step of storing results of processing of the point cloud using the at least one processor.

6. A method for processing point cloud data of an object in a simulated three-dimensional environment, the method comprising the steps of:
    retrieving said point cloud data to display said object corresponding to said point cloud data in said simulated three-dimensional environment using the at least one processor;
    moving said displayed object in said simulated three-dimensional environment in case of a user's instruction by rotating the point cloud about an X-axis, a Y-axis, and/or Z-axis, and/or moving the point cloud parallel to the X-axis, the Y-axis, and/or the Z-axis using the at least one processor;
    editing said point cloud data to meet said displayed object in said simulated three-dimensional environment after said moving step using the at least one processor;
    altering an observing view on said displayed object in said simulated three-dimensional environment in case of another user's instruction to a top view, a bottom view, a right side view, a left side view, a front view, or a rear view using the at least one processor;
    editing said point cloud data to meet said displayed object in said simulated three-dimensional environment after said altering step using the at least one processor; and
    displaying different portions of a point cloud by using different colors using the at least one processor.

7. The method according to claim 6, further comprising the step of storing results of editing said point cloud data using the at least one processor.

* * * * *